United States Patent [19]
Hines

[11] Patent Number: 5,930,291
[45] Date of Patent: Jul. 27, 1999

[54] METHOD AND APPARATUS FOR SELECTING RANDOM VALUES FROM A NON-SEQUENTIAL SET

[75] Inventor: Keith Michael Hines, Phoenix, Ariz.

[73] Assignee: Motorola, Inc., Schaumburg, Ill.

[21] Appl. No.: 08/051,928

[22] Filed: Apr. 26, 1993

[51] Int. Cl.[6] ............................... H04B 1/713; G06F 7/58
[52] U.S. Cl. ........................... 375/202; 375/200; 380/34; 380/46; 331/78; 364/717.01
[58] Field of Search ................................. 375/1, 200–204, 375/206–210; 380/34, 46; 364/717, 717.01–707.07; 331/78

[56] References Cited

U.S. PATENT DOCUMENTS

| | | | |
|---|---|---|---|
| 4,476,566 | 10/1984 | Dent | 375/1 |
| 4,791,594 | 12/1988 | Harney et al. | 364/717 |
| 5,008,899 | 4/1991 | Yamamoto | 375/1 |

OTHER PUBLICATIONS

Lenk, John D., *Handbook of Microprocessors, Microcomputers, and Minicomputers*;pp. 203–238; (Prentice–Hall, 1979).

*Primary Examiner*—Bernarr E. Gregory
*Attorney, Agent, or Firm*—Bradley J. Botsch

[57] ABSTRACT

A method and apparatus for the selection of random values from a set of N non-sequential values includes software in ROM and RAM for information pool storage. Coupled to the ROM and RAM, a microprocessor sorts the values from smallest to largest, initializes local variables, processes a current value from a first value of the set, and compares the difference to a current information pool entry difference. A range increment is incremented if the difference equals the current information pool entry difference and a new information pool entry is created if the difference does not. The information pool is stored and random values are selected by generating a pseudo random number, constraining the pseudo random number between one and N, indexing into the information pool using the pseudo random number to create a pool entry index and generating the random value using a selected pool entry first value.

16 Claims, 3 Drawing Sheets

METHOD AND APPARATUS FOR SELECTING RANDOM VALUES FROM A NON-SEQUENTIAL SET

BACKGROUND OF THE INVENTION

This invention relates in general to methods and apparatus for the generation of random selections, and in particular to methods and apparatus for the selection of random values from a fixed set which may not be sequential.

The term "sequential" is used herein to denote "natural series", such as the set of integers. Examples of non-sequential series include: {1, 2, 3, 5, 8, 9}, {0.1, 0.3, 0.435, 0.9999, 7.7333}, and {−5.01, −0.2, 3, 4, 5}.

Many applications require random number selection from a set of numbers which may be non-sequential, especially applications where a limited finite amount of selection time is a constraint. Such applications include, but are not limited to, frequency hopping devices (e.g., radios), encryption technologies, and waveform simulators.

The problems to be solved include:

(1) the generation of random values from a set of values which may be sequential or non-sequential, very large, and comprised of integer and/or floating point values;

(2) use of an apparatus and method which is not dependent upon any known mapping between the set of values and another set (such as the set of natural numbers);

(3) completion of each random value selection within a determinate time;

(4) use of an apparatus and method which require an amount of memory substantially smaller than storing all values of the set in a large array.

One brute-force solution is to treat a set as though it were sequential between the smallest value and the largest value of the set. A series of random values could then be generated until one of the random values matches a member of the set. This solution is unsatisfactory, however, since the process could take forever to generate a value which matches a member of the set.

Another possible solution is to create an array of all possible values within the set and to generate a random index into the set. Although this would be relatively efficient for small sets, the size of the memory would become a constraining limitation on the maximum size of a set.

Still another possible solution would be to use a forced mapping of random numbers onto the values in the set. This solution would not necessarily have a known distribution of output values, however, and would not provide a generalized solution to the problem.

The generation of random values, as applied to frequency hopping radios, must result in the generation of frequencies at very fast rates, without requiring large amounts of memory or processor throughput. For example, it may be desired to generate frequencies of 30.000 MHz to 39.995 MHz on 5 kHz spacing without using 30.030 MHz or 31.005 MHz .

Some hopping radios use repetitive lookup tables, but this method produces an identifiable repetitive hopping signature. Some hopping radios use pre-built frequency tables, but this method limits the amount of time the radio can transmit or receive continuously. Some hopping radios use on the fly generation, but such a method consumes enormous amounts of memory and throughput capacity and is not particularly fast. Furthermore, some on the fly generation techniques cannot handle non-sequential frequency sets.

SUMMARY OF THE INVENTION

Accordingly, it is an advantage of the present invention to provide a new and improved method and apparatus for the selection of random values from a set of values which may be non-sequential. It is a further advantage of the present invention that the values may be sequential or non-sequential, very large, and comprised of integer and/or floating point values. It is still a further advantage of the present invention that the apparatus and method used is not dependent upon any known mapping between the set of values and another set. It is yet a further advantage of the present invention that completion of each random value selection is accomplished within a determinate time. It is yet a further advantage of the present invention that the amount of memory required to implement the method is substantially smaller than that required to store all values of the set in a large array.

To achieve these advantages, an apparatus for the selection of random values from a non-sequential set is contemplated which includes read only memory (ROM) for storage of software including program steps for fast, random value selection from the set of numbers. Random access memory (RAM) is also included for storage of an information pool. A microprocessor is coupled to the ROM and to the RAM and is capable of generating a random number seed, receiving the set of numbers, receiving and executing the program steps, and generating an information pool of data in selection of the random values.

The method for the selection of random values from a non-sequential set starts with the set of values numbering N. The values are sorted from smallest value to largest value and a blank information pool is created from the N values. The information pool results from initializing local variables for tracking the information pool, processing a current value from a first value of the set of values, and comparing the difference to a current information pool entry difference associated with a current information pool entry. A difference is calculated between a next value of the set of values and the current value and a range increment is incremented if the difference equals the current information pool entry difference. If the difference does not equal the current information pool entry difference a new information pool entry is created. The information pool is then stored.

Random values are selected from the information pool by generating a pseudo random number using a pseudo random number generator, constraining the pseudo random number between one and N, indexing into the information pool using the pseudo random number to create a pool entry index and generating the random value using a selected pool entry first value.

The above and other features and advantages of the present invention will be better understood from the following detailed description taken in conjunction with the accompanying drawings.

DETAILED DESCRIPTION OF THE PREFERRED METHODS AND EMBODIMENTS

Figure 1:
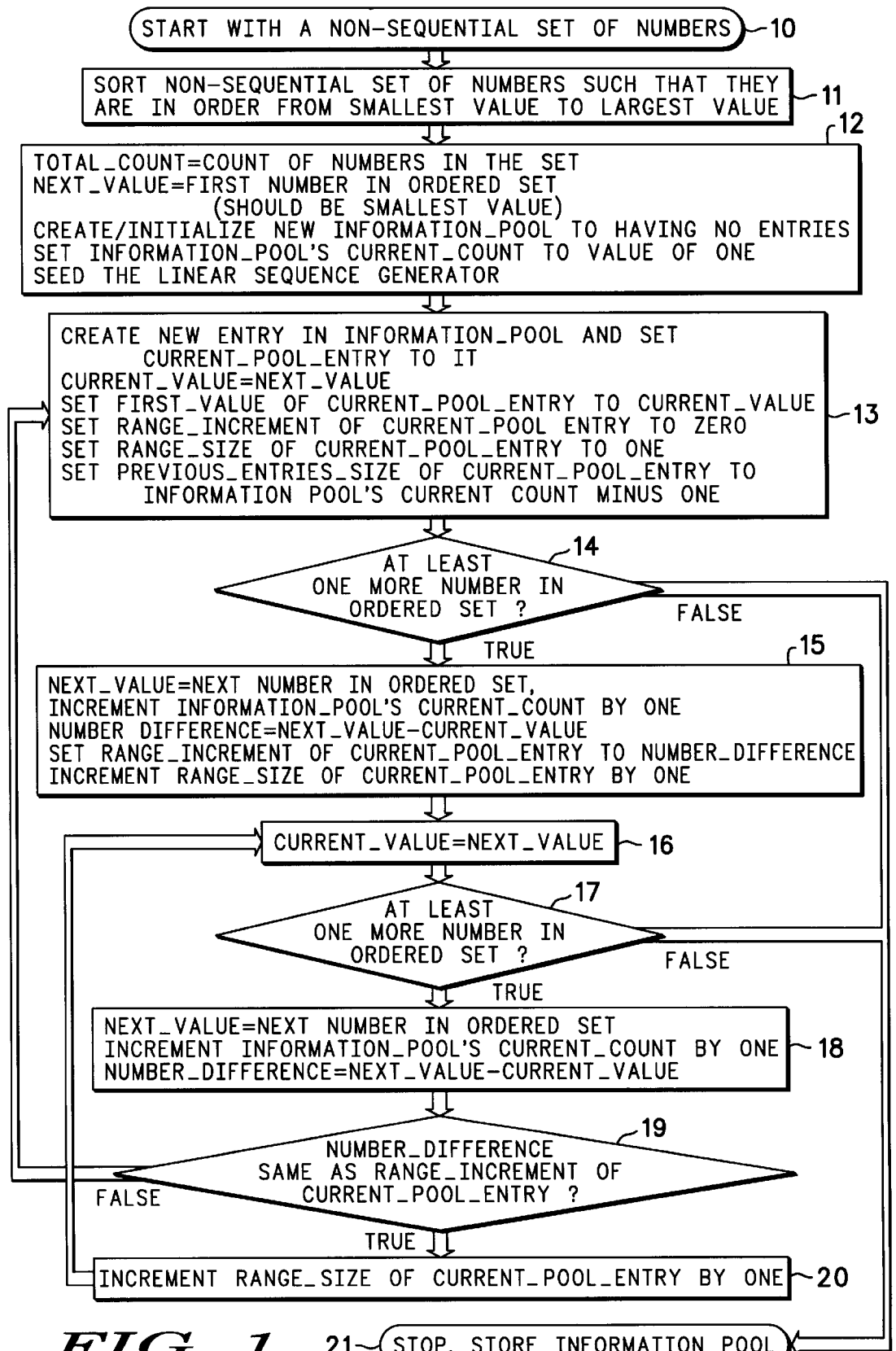
In FIG. 1, there is shown a flowchart of a method for the generation of an information pool to be used in the selection of random values from a non-sequential set in accordance with a preferred method of the invention.

In FIG. 1, there is shown a flowchart of a method for the generation of an information pool to be used in the generation of random values from a non-sequential set in accordance with a preferred method of the invention.

Start box 10 begins the procedure by providing a non-sequential set of numbers (values). Box 11 illustrates the step of sorting the non-sequential set of numbers such that the numbers comprising the elements of the set are in order from the smallest value to the largest value. A Total Count is set equal to the count of numbers in the set in box 12. A Next Value is defined as the first number in the ordered set, which should be the smallest value since the numbers have been sorted. Box 12 also illustrates the step of creating and initializing a new Information Pool to having no entries. An Information Pool Current Count is set to the value 1. Box 12 also illustrates the step of seeding a linear sequence generator.

A loop is begun in the procedure for generating an Information Pool beginning in box 13. Box 13 illustrates the step of creating a new entry in the Information Pool and setting a Current Pool Entry equal to it. Box 13 also illustrates setting a Current Value equal to a Next Value. A First Value of the Current Pool Entry is set equal to the Current Value in box 13 as well. A Range Increment of the Current Pool Entry is set to zero, a Range Size of the Current Pool Entry is set to one, and a Previous Entries Size of the Current Pool Entry is set equal to the Information Pool's Current Count minus one in box 13.

If there are more numbers in the ordered set to process, the procedure proceeds via the TRUE path from box 14 to box 15 in FIG. 1. If there are no additional numbers in the ordered set to process, the procedure proceeds from box 14 via the FALSE path to stop box 21.

In box 15 of FIG. 1, the Next Value is set equal to the next number in the ordered set. Box 15 further illustrates the step of incrementing the Information Pool's Current Count by one, and setting a Number Difference equal to the Next Value minus the Current Value. The Range Increment of the Current Pool Entry is set equal to the Number Difference, as well. Finally, box 15 illustrates the step of incrementing the Range Size of the Current Pool Entry by one.

Box 16 in FIG. 1 illustrates the step of setting the Current Value equal to the Next Value. If there is at least one more number in the ordered set, the procedure proceeds from box 17 to box 18 via the TRUE path. If there is not at least one more number in the ordered set, the procedure proceeds the FALSE path from box 17 to the STOP box 21.

If there is at least one more number in the ordered set, box 18 illustrates the step of setting the Next Value equal to the next number in the ordered set. Box 18 also illustrates the step of incrementing the Information Pools Current Count by one, and setting the Number Difference equal to the Next Value minus the Current Value.

Box 19 illustrates a decision step in the Information Pool generation process. If the Number Difference in box 19 is the same as the Range Increment of the Current Pool Entry, the procedure proceeds via the TRUE path to box 20. If the Number Difference differs from the Range Increment of the Current Pool Entry, the procedure proceeds via the FALSE path from box 19 to box 13, wherein the loop procedure beginning with box 13 continues.

Box 20 illustrates the step of incrementing the Range Size of the Current Pool Entry by one. After box 20, the procedure proceeds to box 16 to process the Next Value and continue.

In function, the procedure in generating the Information Pool in FIG. 1 is as follows: First, the set of non-sequential numbers in the set is sorted, so that it is easier to manipulate. A blank Information Pool is created and all variables for tracking the Information Pool and the Input Set are initialized. The procedural loop, beginning in box 13 and ending with box 20, starts by adding a new entry into the Information Pool. Inside the loop, the method takes the Next Number from the input set and calculates the difference between the Next Number and the Current Value. A check is made in box 19 to determine if the calculated difference (equal to the Range Increment in box 13) is the same as the difference of the numbers in the Current Pool Entry. If the calculated difference is the same, then this Next Value can be represented as another increment in the Range Size and the Current Pool Entry. When the difference is not the same, then a new Pool Entry is created by returning to box 13.

Figure 2:
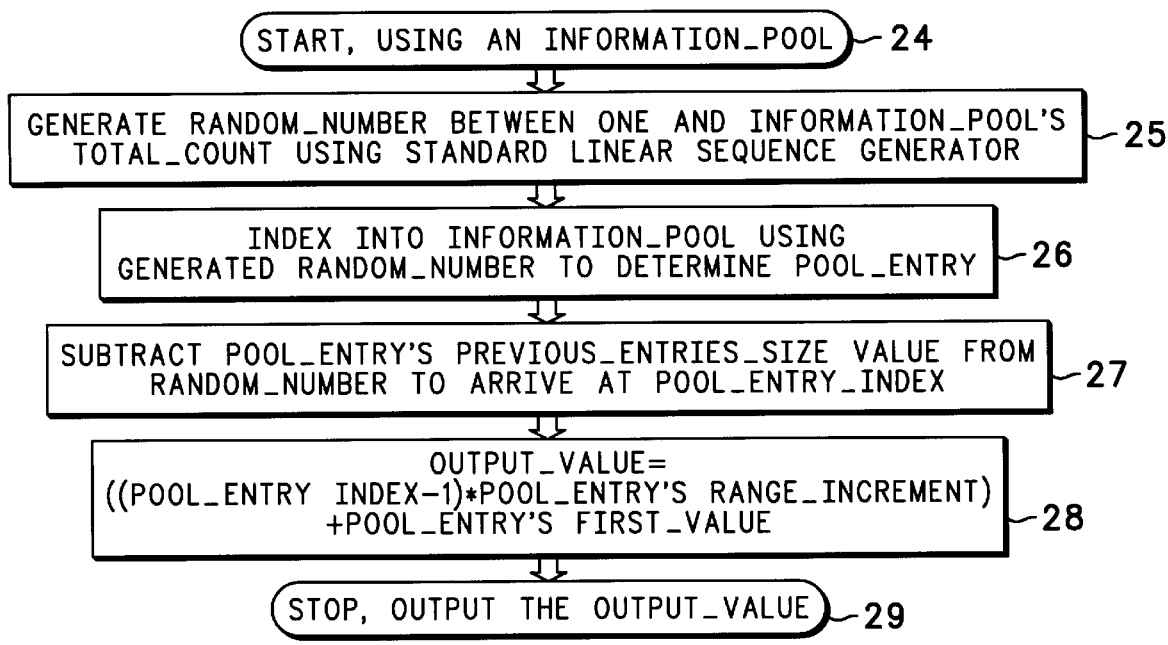
In FIG. 2, there is shown a flowchart of the generation of random selections from the information pool created as a result of the method in FIG. 1, the generation of random selections in accordance with a preferred method of the invention.

In FIG. 2, there is shown a flow chart of the generation of random selections from the Information Pool created as a result of the method in FIG. 1. The procedure in FIG. 2 is used to generate Output Values from the Information Pool resulting from the FIG. 1 procedure. Box 24 illustrates the start of the procedure for using the Information Pool. Box 25 illustrates the step of generating and constraining a pseudo Random Number between 1and the Information Pool's Total Count using a standard linear sequence generator (pseudo random number generator). Box 26 illustrates the step of indexing into the Information Pool using the generated pseudo Random Number to determine a Pool Entry.

A Pool Entry's Previous Entries Size value is subtracted from the Random Number to create a Pool Entry Index in box 27. An Output Value (the random value from the set of values) is generated in box 28, based on the selected pool entry. The Output Value is equal to ((Pool Entry Index - 1)* Pool Entries Range Increment)+Pool Entries First Value. Box 29 illustrates the step of outputting the Output Value and stopping the procedure.

The following is a box by box example of the generation of an Information Pool from a non-sequential set of numbers (i.e. the FIG. 1 procedure):

EXAMPLE:

BOX 10:   START with non-sequential set of numbers = {19, 25, −3, 10, 32, 31}
BOX 11:   Sorted non-sequential set of numbers = {−3, 10, 19, 25, 31, 32}
BOX 12:   Total Count = 6
          Next Value = −3
          Seed linear sequence generator with 1011101010101.
              Information Pool
              Current Count = 1
              {}
BOX 13:   Current Value = −3
              Information Pool
Current Pool Entry   >First Value = −3   Range Increment = 0    Range Size = 1   Previous Entries Size = 0
BOX 14:   TRUE
BOX 15:   Next Value = 10
          Number Difference = 13
              Information Pool
              Current Count = 2
Current Pool Entry   >First Value = −3   Range Increment = 13   Range Size = 2   Previous Entries Size = 0
BOX 16:   Current Value = 10
BOX 17:   TRUE
BOX 18:   Next Value = 19
          Number Difference = 9
              Information Pool
              Current Count = 3
Current Pool Entry   >First Value = −3   Range Increment = 13   Range Size = 2   Previous Entries Size = 0
BOX 19:   FALSE
BOX 13:   Current Value = 19
              Information Pool
              Current Count = 3
              First Value = −3    Range Increment = 13   Range Size = 2   Previous Entries Size = 0
Current Pool Entry   >First Value = −3   Range Increment = 0    Range Size = 1   Previous Entries Size = 2
BOX 14:   TRUE
BOX 15:   Next Value = 25
          Number Difference = 6
              Information Pool
              Current Count = 4
              First Value = −3    Range Increment = 13   Range Size = 2   Previous Entries Size = 0
Current Pool Entry   >First Value = 19   Range Increment = 6    Range Size = 2   Previous Entries Size = 2
BOX 16:   Current Value = 25
BOX 17:   TRUE
BOX 18:   Next Value = 31
          Number Difference = 6
              Information Pool
              Current Count = 5
              First Value = −3    Range Increment = 13   Range Size = 2   Previous Entries Size = 0
Current Pool Entry   <First Value = 19   Range Increment = 6    Range Size = 2   Previous Entries Size = 2
BOX 19:   TRUE
BOX 20:
              Information Pool
              Current Count = 5
              First Value = −3    Range increment = 13   Range Size = 2   Previous Entries Size = 0
Current Pool Entry   >First Value = 19   Range Increment = 6    Range Size = 3   Previous Entries Size = 2
BOX 16:   Current Value = 31
BOX 17:   TRUE
BOX 18:   Next Value = 32
          Number Difference = 1
              Information Pool
              Current Count = 6
              First Value = −3    Range Increment = 13   Range Size = 2   Previous Entries Size = 0
Current Pool Entry   >First Value = 19   Range Increment = 6    Range Size = 3   Previous Entries Size = 2
BOX 19:   FALSE
BOX 13:   Current Value = 32
              Information Pool
              Current Count = 6
              First Value = −3    Range Increment = 13   Range Size = 2   Previous Ehtries Size = 0
              First Value = 19    Range Increment = 6    Range Size = 3   Previous Entries Size = 2
Current Pool Entry   >First Value = 32   Range Increment = 0    Range Size = 1   Previous Entries Size = 5
BOX 14:   FALSE
BOX 21:   STOP The following are three box by box examples of the generation of an
Output Value from the Information Pool above (i.e. the FIG. 2 procedure
applied to the above example):

EXAMPLE 1:

BOX 24:   START with Information Pool (above)
BOX 25:   Random Number = 4
BOX 26:   Pool Entry =  First Value = 19    Range Increment = 6    Range size = 3   Previous Entries Size = 2

-continued

Figure 3:
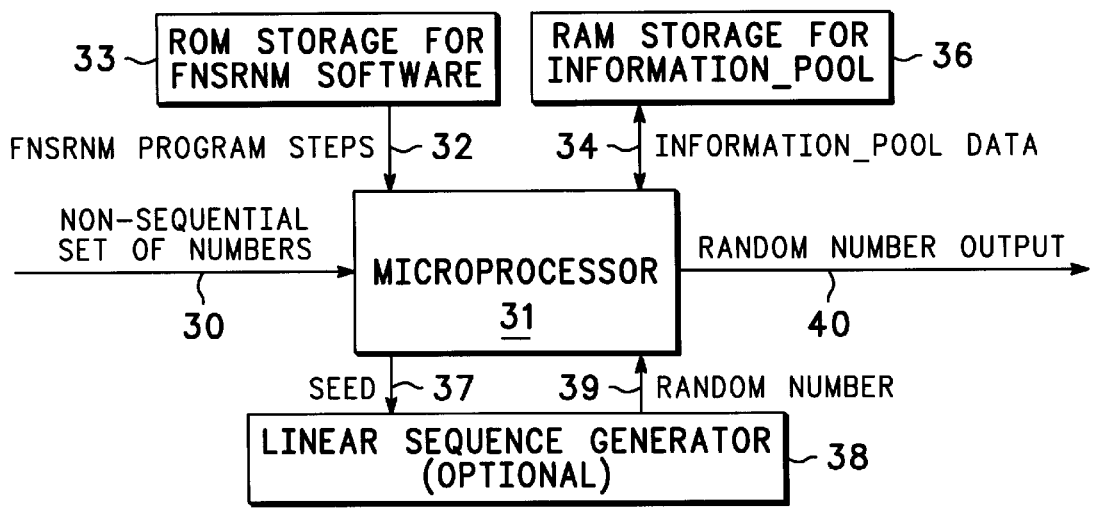
In FIG. 3, there is shown a block diagram of a device implementing the methods illustrated in FIGS. 1 and 2, in accordance with a preferred embodiment of the invention.

BOX 27:      Pool Entry Index = 4 − 2 = 2
BOX 28:      Output Value = ((2 − 1)*6) + 19 = 25
BOX 29:      STOP
EXAMPLE 2:

BOX 24:      START with information Pool (above)
BOX 25:      Random Number = 1
BOX 26:      Pool Entry = First Value = −3    Range Increment = 13   Range Size = 2   Previous Entries Size = 0
BOX 27:      Pool Entry Index = 1 − 0 = 1
BOX 28:      Output Value = ((1 − 1)*13) + (−3) = −3
BOX 29:      STOP
EXAMPLE 3:

BOX 24:      START with Information Pool (above)
BOX 25:      Random Number = 6
BOX 26:      Pool Entry = First Value = 32    Range Increment = 0    Range size = 1   Previous Entries Size = 5
BOX 27:      Pool Entry Index = 6 − 5 = 1
BOX 28:      Output Value = ((1 − 1)*0) + 32 = 32
BOX 29:      STOP In FIG. 3, there is shown a block diagram of a device implementing the methods illustrated in FIGS. 1 and 2, i.e., a fast, non-sequential random number machine (FNSRNM), in accordance with a preferred embodiment of the invention. The device can be implemented using a computer or microprocessor. In FIG. 3, box 33 illustrates read-only-memory (ROM) storage for FNSRNM software. The ROM 33 provides FNSRNM program steps 32 to microprocessor 31. Random access memory (RAM) storage is provided for the Information Pool, as illustrated in box 36. RAM 36 can provide stored Information Pool data 34 to microprocessor 31.

The FNSRNM program steps 32 act on a non-sequential set of numbers 34 in the microprocessor 31 to create the Information Pool data 34 to produce random number output 40. Any microprocessor 31 will work for implementing the FNSRNM method, however, the speed of the FNSRNM method is directly dependent upon the amount of throughput of the microprocessor 31. If box 25, the generation of Random Number, in FIG. 2 is implemented in hardware, then a hardware linear sequence generator 38 is required as providing Random Number 39 in FIG. 3. Microprocessor 31 generates a seed 37 to the linear sequence generator 38 to produce such a starting Random Number 39.

The source of the initial set of numbers 34 in FIG. 3 can be from an operator, a predefined set stored in additional ROM, or from an external device. The FNSRNM will output a Random Number Output 40 from a set of numbers 34 every N seconds where N is based on the throughput of the microprocessor 31 and the efficiency of the program steps 32. The Random Number Output 40 can be used by any other device or system requiring repeatable Random Number sequences from a non-sequential set of numbers 34 with or without a speed requirement.

Figure 4:
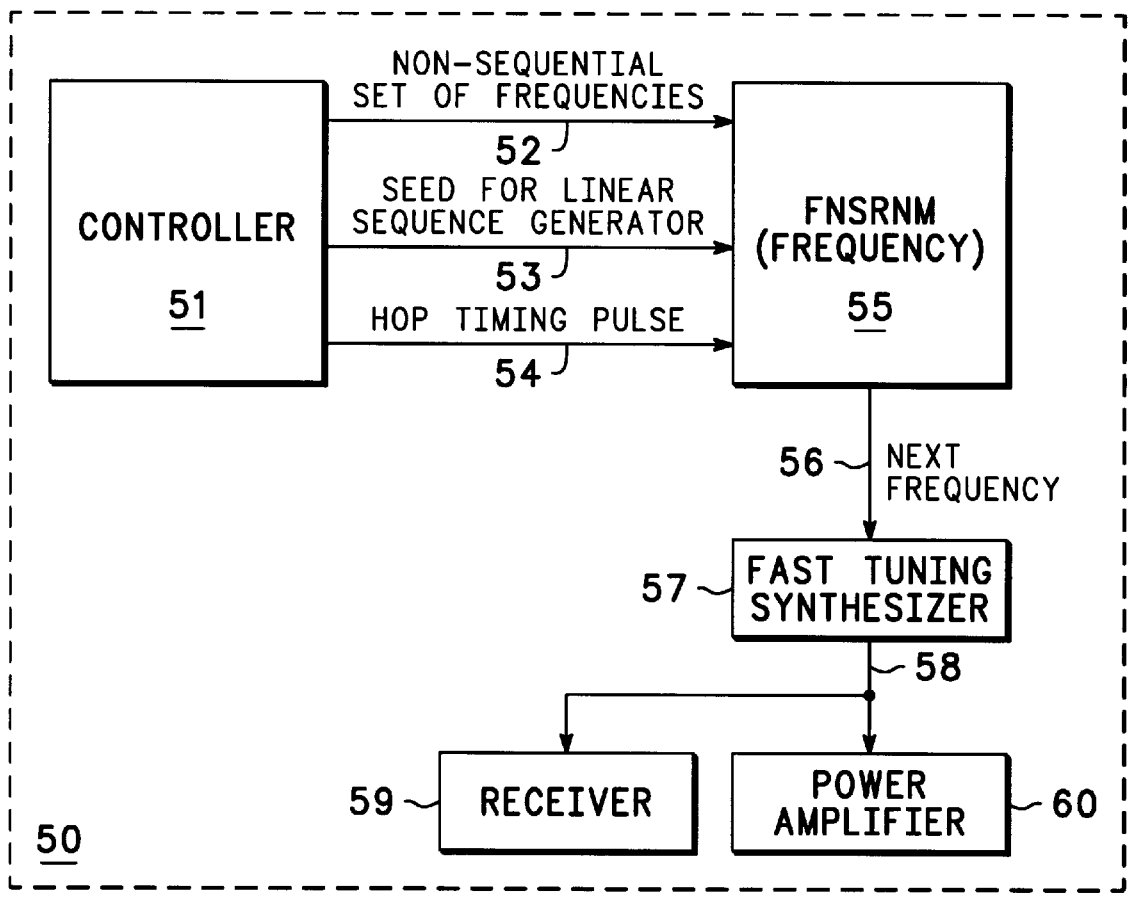
In FIG. 4, there is shown a schematic of the device of FIG. 3 in a frequency-hopping radio application, in accordance with a preferred embodiment of the invention.

In FIG. 4, there is a shown a schematic of the device of FIG. 3 in a frequency hopping radio application in accordance with a preferred embodiment of the invention. The frequency hopping radio 50 in FIG. 4 uses a FNSRNM 55, such as is illustrated in FIG. 3. The FNSRNM 55 is used to generate frequency for hopping. FIG. 4 illustrates a fast-tuning synthesizer 57 coupled to and fed by a frequency generating FNSRNM 55. The FNSRNM 55 can be implemented within the controller 51 or as an external block distinct from the controller 51 as shown in FIG. 4.

A scenario of how this frequency hopping radio works is as follows: an operator enters (by keypad or download device) a valid hopping frequency set 52 (which may be non-sequential) to the controller 51. The controller 51 feeds this frequency set 52 into the frequency FNSRNM 55. The frequency FNSRNM 55 generates an Information Pool from the frequency set 52. The controller 51 must also provide a seed 53 (starting place) for the frequency FNSRNM 55 pseudo random number generator (for example, the seed can be associated with the time of day). When the operator signals to the controller 51 that he or she wants to receive or transmit, the controller 51 starts sending a hop-timing pulse for every hop-time and the frequency FNSRNM 55 generates a next frequency output 56 (random frequency selection) and outputs the next frequency output 56 to the fast-tuning synthesizer 57. The fast-tuning synthesizer output 58 is input to the receiver 59 and also to the power amplifier 60 of the frequency hopping radio 50.

The frequency FNSRNM 55 has the ability to generate frequencies from a non-sequential set of frequencies (e.g. 30.000 MHz through 39.995 MHz on 5 kHz spacing without using 30.030 MHz or 31.005 MHz) on-the-fly, i.e. real time, at very fast rates, without needing large amounts of memory or processor throughput.

Most hopping radios use one of the following methods for hopping:

1. Repetitive lookup tables which produce an identifiable repetitive hopping signature;

2. Pre-built frequency tables which limit the amount of time the radio can transmit or receive continuously;

3. On-the-fly generation which consumes enormous amounts of memory and where throughput is not fast compared to the FNSRNM; and 4. On-the-fly generation which cannot handle non-sequential frequency sets.

The input non-sequential frequency set 52 is usually provided by a frequency management device which attaches to an external connector of the frequency hopping radio 50 (like a fill device on cryptographic equipment), although the input non-sequential frequency set 52 can be input by an operator. The output random number frequencies (next frequency output 56) are used by the fast-tuning synthesizer 57 to tune. The fast-tuning synthesizer 57 will constantly tune to different frequencies at a specified rate (such as 200 hops per second). This means that the frequency FNSRNM 55 must be capable of outputting a next frequency output 56 to the fast-tuning synthesizer 57 at a corresponding rate (such as every 5 milliseconds in this example).

Thus, a method and apparatus for the selection of random values from a non-sequential set has been described which overcomes specific problems and accomplishes certain advantages relative to prior art methods and mechanisms. The improvements over known technology are significant. The values may be sequential or non-sequential, very large, and comprised of integer and/or floating point values. The apparatus and method are not dependent upon any known mapping between the set of values and another set. Completion of each random value selection is accomplished within a determinate time. The amount of memory required to implement the method is substantially smaller than that required to store all values of the set in a large array. Finally, the method and apparatus are suitable for a wide range of applications, including frequency-hopping radios, encryption technologies, and waveform simulators.

Thus, there has also been provided, in accordance with an embodiment of the invention, a method and apparatus for the selection of random values from a non-sequential set that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A method for the selection of pseudorandom values in a computer to generate frequencies for hopping in a frequency hopping radio, the method comprising the steps of:

providing a set of values numbering N;

sorting the set of values from smallest value to largest value;

creating a blank information pool from the N values;

initializing local variables for tracking the information pool;

processing a current value from a first value of the set of values;

calculating a difference between a next value of the set of values and the current value;

comparing the difference to a current information pool entry difference associated with a current information pool entry;

incrementing a range increment of the current information pool entry if the difference equals the current information pool entry difference;

creating a new information pool entry if the difference does not equal the current information pool entry difference;

storing the information pool;

generating a frequency output using the information pool.

2. A method for selection of pseudorandom values as claimed in claim 1, wherein the steps of processing, calculating, comparing, incrementing, creating and storing are repeated for each value of the set of values.

3. A method for selection of pseudorandom values as claimed in claim 1, further comprising the steps of:

generating a pseudorandom number using a pseudorandom number generator;

constraining the pseudorandom number between one and N;

indexing into the information pool using the pseudorandom number to create a pool entry index; and generating a pseudorandom value using a selected pool entry first value.

4. A method for selection of pseudorandom values as claimed in claim 3, wherein the step of generating a pseudorandom number comprises the step of using a linear sequence generator.

5. A method for selection of pseudorandom values as claimed in claim 3, wherein the steps of constraining, indexing, and generating the pseudorandom value each comprise the step of using software stored in read only memory (ROM).

6. A method for selection of pseudorandom values as claimed in claim 3, wherein the step of generating a pseudorandom number comprises the step of using hardware.

7. A method for selection of pseudorandom values as claimed in claim 3, wherein the step of generating the pseudorandom value further comprises the step of generating the pseudorandom value as a function of the pool entry index and the range increment.

8. A method for selection of pseudorandom values as claimed in claim 1, wherein each of the steps of sorting, creating, initializing, processing, calculating, comparing, incrementing, and creating are comprised of the step of using software stored in computer read-only memory (ROM).

9. A method for selection of pseudorandom values as claimed in claim 1, wherein each of the steps of sorting, creating, initializing, processing, calculating, comparing, incrementing, and creating are comprised of the step of using a microprocessor.

10. A method for selection of pseudorandom values as claimed in claim 1, wherein each of the steps of creating, initializing, calculating, incrementing, and creating are comprised of the step of using random-access memory (RAM).

11. A frequency hopping radio comprising:

a controller for providing a frequency set of values;

a fast, non-sequential pseudorandom number machine coupled to the controller, the fast, non-sequential pseudorandom number machine for receiving the frequency set and for producing a next frequency output;

a fast tuning synthesizer coupled to the fast, non-sequential pseudorandom number machine, the fast tuning synthesizer for receiving the next frequency output and for producing a fast tuning synthesizer output;

a receiver coupled to the fast tuning synthesizer, the receiver for receiving the fast tuning synthesizer output; and a power amplifier coupled to the fast tuning synthesizer, the power amplifier for receiving the fast tuning synthesizer output.

12. A frequency hopping radio as claimed in claim 11, wherein the controller further provides a seed and a hop timing pulse to the fast, non-sequential pseudorandom number machine.

13. A frequency hopping radio as claimed in claim 12, wherein the fast, non-sequential pseudorandom number machine comprises:

read only memory (ROM) for storage of software including program steps for next frequency selection from the frequency set;

random access memory (RAM) for storage of an information pool based on the frequency set;

a microprocessor coupled to the ROM and to the RAM, the microprocessor for generating a pseudorandom number seed, for receiving the frequency set, for receiving and for executing the program steps, and for generating the information pool used to produce the next frequency output.

14. A frequency hopping radio as claimed in claim 13, further comprising a linear sequence generator coupled to the microprocessor, the linear sequence generator for receiving the pseudorandom number seed and generating in response a starting pseudorandom number for the microprocessor.

15. A frequency hopping radio as claimed in claim 13, wherein the microprocessor includes a linear sequence generator for receiving the pseudorandom number seed and generating in response a starting pseudorandom number.

16. A frequency hopping radio as claimed in claim 14, wherein the microprocessor generates the next frequency output as a function of a pool entry index, a range increment, and a pool entry first value from the information pool.

* * * * *